Jan. 27, 1959 W. L. MAPPES 2,871,342
CLEARANCE MARKER LIGHT
Filed Dec. 19, 1955
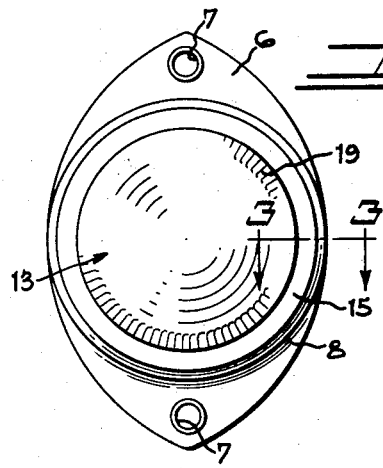
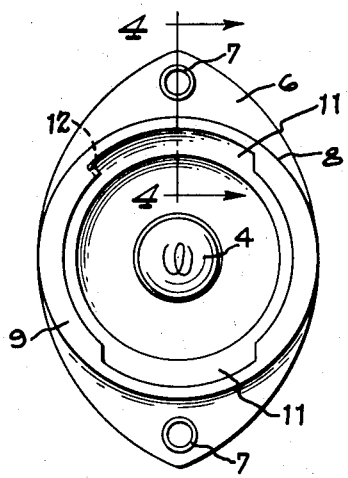
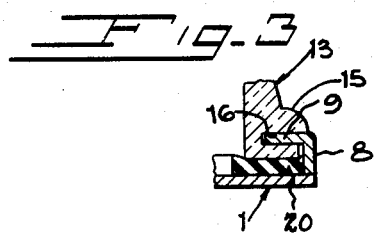
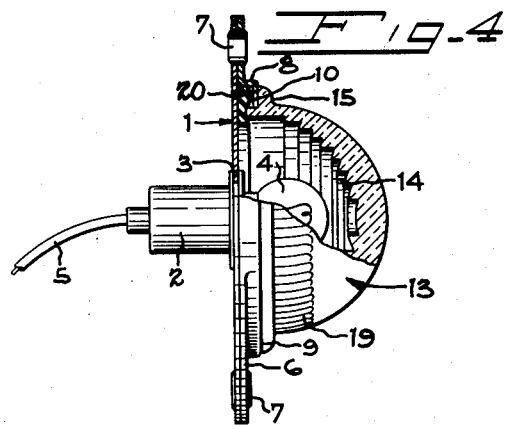
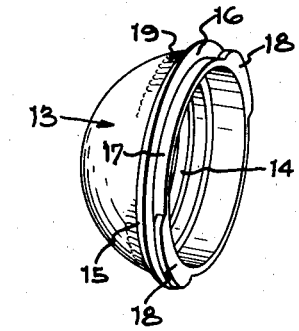
INVENTOR.
William L. Mappes.
BY
Wood, Herron & Evans.
ATTORNEYS.

United States Patent Office 2,871,342
Patented Jan. 27, 1959

2,871,342
CLEARANCE MARKER LIGHT

William L. Mappes, Cincinnati, Ohio, assignor to Northeast Capital Corporation, New York, N. Y., a corporation of New York Application December 19, 1955, Serial No. 554,087

1 Claim. (Cl. 240—8.2)

This invention relates to the construction of electric lights for use on automotive vehicles such as trucks, trailers, and semi-trailers.

The principal objective of this invention has been to provide a vehicle light of simplified construction which can be manufactured at low cost but which will provide satisfactory, reliable service under the adverse conditions of roadway usage. The light units of the present invention are particularly adapted for service as clearance marker lights, but the invention also may be employed advantageously in the construction of tail lights, turn signal lights, and the like.

A modern semi-trailer unit of substantial size carries a number of lights to indicate dimensional outlines during night-time travel. Some are installed along the sides, a few at the front end, and a number at the rear along the bottom and top beams. Although each lamp may be relatively low in cost, the substantial number of them required, by law in some states, represents an appreciable item in the total cost; hence, the objective is to fabricate a structure which is less expensive to manufacture than the clearance lights which are now available.

This invention further contemplates a vehicle light having a lens which readily may be removed without the use of tools in order to facilitate replacement of the electric lamp bulb when it becomes burned out, and a demountable lens construction which is in substantially water and dust-tight connection with the base in order that the lens interior will not become so dirty during prolonged usage that the light will fail to shine brightly through the lens. While vehicle lights heretofore have been available which are adequately water and dust-tight, tools have been required to demount the lens or to replace it when the electric light bulb needs replacement. Although each electric light bulb has a normal life of perhaps six months or considerably more, still, they frequently become inoperable and, because of the number of lights which are carried on a conventional vehicle, the need to change bulbs arises frequently. Thus, a principal objective of this invention has been to provide a vehicle light having a lens which can be demounted and remounted with ease and convenience such that no tools or other implements need be employed and such that the electric light bulb may be changed on the road by simple manual manipulation whenever the need arises.

A typical embodiment of the invention furnishing these features is illustrated in the accompanying drawings in which:

Figure 1 is a plan view of a typical light adapted particularly for use as a clearance marker light;

Figure 2 is a plan view similar to Figure 1 but with the lens removed to expose the electric light bulb;

Figure 3 is a cross-sectional view taken on the line 3—3 of Figure 1;

Figure 4 is a cross-sectional view taken on the line 4—4 of Figure 2; and

Figure 5 is a perspective view showing the lens element.

The clearance marker light illustrated in the drawings comprises a base indicated generally at 1 which may be in the form of a sheet metal stamping. A conventional electric socket 2 is fastened to the base, for example by spinning, as at 3, and the socket is adapted to receive an electric light bulb 4. The construction of the socket is conventional and well-known in the art, and therefore, is not shown in detail in the drawings. As in common practice, the base, electrically grounded, furnishes one side of the electric circuit to the light bulb while the other side of the circuit is furnished by the insulated conductor 5 extending from the socket.

A second member 6, which may have the same exterior contour as the base, fits facially against the base, and it is fastened thereto by metal grommets 7, 7 which also provide holes to receive suitable fastening screws through which the marker light as a whole is mounted on the vehicle. However, the central portion of the member 6 is off-set laterally with respect to the base 1 through the annular ring portion 8, and a circular flange 9 is bent inwardly from the annular ring 8 so as to provide an open annular recess 10 between the exterior face of the base 1 and the interior face of the flange 9.

The flange 9 has entrance gaps 11 cut in it at opposed points. There may be two, three, four, or more of these gaps, depending upon the over-all size of the clearance marker. At the end of one of the gaps a tang 12 is bent downwardly into the recess 9 to act as a stop.

The lens for the assembly is indicated generally at 13. It is preferably of hemispherical form, made of suitably colored transparent plastic material, and it contains annular facets 14 at the interior which serve to distribute the light rays emanating from the filament in the bulb 4. The exterior surface of the lens preferably is smooth. A flange portion 15 projects laterally from the lens near its open end to provide an annular shoulder face 16 which is adapted to reside closely adjacent the outer face of the flange 9 on the lamp base. Extending longitudinally beyond the shoulder face 16, the lens element is provided with a circular skirt portion 17 having an external diameter which is slightly less than the internal diameter across the mouth of the annular recess 10. In addition, the skirt 17 carries ears 18 which project outwardly therefrom. The ears 18 respectively are positioned for reception within the entrance gaps 11 of the flange 9 and are spaced from the shoulder face 16 a distance slightly greater than the cross-sectional thickness of the flange 9. The outer faces of the ears 18 terminate in the plane of the end of the skirt 17 so that they are flush with it.

Preferably, although not necessarily, the bulbous portion of the lens at the area adjacent the flange 15 contains a band of ribbing 19 which not only serves to distribute light from the bulb 4 but also facilitates engagement of the fingers with the otherwise smooth surface of the lens so as to permit the lens to be rotated.

There are as many ears 18 on the lens as there are gaps 11 in the lens, and it will be seen that the engagement of the lens with the base is of the bayonet-catch type. However, under the vibrations to which an electric light is subjected in use on an automotive vehicle, a conventional bayonet-type connection would soon rattle loose and the lens would be lost. In accordance with the present invention, a resiliently compressible washer 20, which may be of rubber or similar material, is placed within the recess 10, the washer being of such annular width that its internal diameter is less than the internal diameter of the skirt 17 of the lens, while the external diameter of the washer is such that it is engaged facially by the ears 18 as well as the end of the skirt. The washer is sufficiently thick, in proportion to the height of the recess 10 and the thickness of the ears 18, that the washer is compressed to a lesser thickness when the ears reside behind the flange 9 in the recess 10.

By this construction, a peculiar locking effect is obtained which has been found to prevent inadvertent detachment of the lens from the base under severe and prolonged vibration. While the surface of the washer affords friction tending to restrain relative movement, the relative thickness of the washer with respect to the recess and the thickness of the ears 18 causes the portions of the washer which are directly beneath the ears to be compressed to a greater degree than those portions of the washer residing circumferentially intermediate the ears. As a result, along the peripheral edges of the ears, as shown in Figure 3, and particularly along the ends of the ears, the washer assumes an inclined or ramp configuration which acts in use as a stop mechanically preventing counter rotation of the lens through which it otherwise might become dislodged.

This stop effect is not dependent upon the facial friction characteristics of the resilient washer but rather it is obtained because the ears become virtually embedded within the washer through its differential compression to a degree sufficient to prevent the lens from moving under the influence of vibration. However, this mechanical locking of the ears against rotation by the washer is not sufficient to prevent the lens from being rotated manually by the fingers relative to the washer, or otherwise prevent the relative rotation of the washer with respect to the base member which is required to effect demounting of the lens from the base. Thus, to secure the lens upon the base, the lens, held by the fingers, is brought into position over the flange 9, with the ears 18 aligned with the gaps 11. The lens is then pushed inwardly toward the base sufficiently for the ears to pass into the recess area between the inner face of the flange 9 and the outer face of the washer. In this operation, it will be noted that the endwise portion of the skirt 17 which is flush with the ears circumferentially compresses the washer. By now turning the lens in a suitable direction, i. e., clockwise in the structure shown in the drawings, the ears are caught beneath the flange 9. This rotation is continued until the end of an ear 18 engages the stop 12 which prevents further rotation. In this connection it will be noted that the shoulder 15 limits the degree of inward movement which, if excessive, might otherwise tend to prevent the operator from being able to rotate the lens because of the frictional engagement of the washer with it. The resilient washer now urges the inner faces of the ears 18 against the inner face of the flange 9, but those portions of the washer adjacent the ends of the ears, being free from compression, extend upwardly along the ends of the ears and serve to prevent counter rotation of the lens. Meanwhile, however, a continuous peripheral compression seal is afforded by engagement of the continuous end of the skirt 17 with the washer, and this seal prevents the entrance of dust and rain water to the interior of the unit.

To demount the lens for bulb replacement, it is only necessary for the operator to engage the lens with the fingers and turn it in counter direction to re-align the lens with the gaps 11, thereby freeing the lens from attachment to the base.

The reliability of the lens mounting of the present invention in conjunction with the ready demountability of the lens from the base which the invention provides at an over-all low cost of manufacture makes the structure particularly useful in the fabrication of clearance marker lights for automotive vehicles, for which reason the invention has been disclosed particularly in relation thereto, but it will be understood that the advantages of the invention may also be employed with equal advantage in the construction of lights for other purposes such as tail lights, turn signal lights, and the like.

Having described my invention, I claim:

An electric clearance marker light for roadway vehicles, comprising a flat sheet metal base having a ring portion projecting laterally therefrom and a circular flange extending marginally from said ring portion in a direction generally parallel to the plane of said base, whereby the ring, base, and flange delineate an annular recess, the said flange having gaps therein providing entrances to said recess, a lens element terminating in a skirt adapted to be received telescopically within the recess area, the said skirt having ears projecting in generally radial direction therefrom, which ears are adapted to be received through the said entrance gaps into the recess annulus upon subsequent rotation of the lens in the plane of said recess, a compressible washer of resilient material disposed within the recess annulus, one face of the washer engaging the base, the other face of the washer being engageable by the ears when the lens is rotated to lock the ears within the recess; the uncompressed thickness of said washer plus the thickness of the ears when in engagement therewith being substantially greater than the base-to-flange height of said recess, whereby said washer is compressed to substantially reduced thickness upon entry of said ears into said recess beneath said flange, the said lens having a circumferential shoulder spaced longitudinally from the ears for disposition closely adjacent the exterior circumferential face of the recess, said circumferential shoulder being disposed to engage said flange to limit inward movement of said lens, and socket means for the reception of an electric light bulb carried by said base behind said lens.

References Cited in the file of this patent

UNITED STATES PATENTS

| 145,200 | Hyatt | Dec. 2, 1873 |
| 1,085,200 | Foard | Jan. 27, 1914 |
| 2,073,074 | Sauer | Mar. 9, 1937 |
| 2,096,270 | Worden | Oct. 19, 1937 |
| 2,219,940 | Ritz-Woller | Oct. 29, 1940 |
| 2,685,639 | Wiley | Aug. 3, 1954 |
| 2,699,491 | Sternaman | Jan. 11, 1955 |

FOREIGN PATENTS

| 1,093,386 | France | Nov. 17, 1954 |